US011175471B2

United States Patent
Murthy et al.

(10) Patent No.: US 11,175,471 B2
(45) Date of Patent: Nov. 16, 2021

(54) PREDEFINED CYLINDRICAL ENCLOSURE FOR OPTICAL WAVEGUIDE CABLE

(71) Applicant: Sterlite Technologies Limited, Aurangabad (IN)

(72) Inventors: Venkatesh Murthy, Aurangabad (IN); Kishore Sahoo, Aurangabad (IN); Sravan Kumar Peraka, Aurangabad (IN); Atul Mishra, Aurangabad (IN); Pavan Kumar Moturu, Aurangabad (IN); Kavya Chintada, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 15/942,257

(22) Filed: Mar. 30, 2018

(65) Prior Publication Data
US 2019/0250346 A1 Aug. 15, 2019

(30) Foreign Application Priority Data
Feb. 14, 2018 (IN) .............................. 201811005501

(51) Int. Cl.
*G02B 6/44* (2006.01)

(52) U.S. Cl.
CPC ......... *G02B 6/4494* (2013.01); *G02B 6/4402* (2013.01); *G02B 6/4403* (2013.01); *G02B 6/4432* (2013.01); *G02B 6/4433* (2013.01); *G02B 6/4434* (2013.01); *G02B 6/4484* (2013.01)

(58) Field of Classification Search
CPC ... G02B 6/4402; G02B 6/4434; G02B 6/4433
See application file for complete search history.

(56) References Cited

U.S. PATENT DOCUMENTS

| 5,740,295 A * | 4/1998 | Kinard | G02B 6/441 385/103 |
| 6,229,944 B1 * | 5/2001 | Yokokawa | G02B 6/4483 385/112 |
| 6,870,995 B2 * | 3/2005 | Johnson | G02B 6/4403 385/109 |
| 9,140,867 B1 * | 9/2015 | Sandate Aguilar | G02B 6/4488 |

(Continued)

*Primary Examiner* — Ryan A Lepisto (57) ABSTRACT

The present disclosure provides an optical waveguide cable. The optical waveguide cable includes one or more optical waveguide bands positioned substantially along a longitudinal axis of the optical waveguide cable. Further, the optical waveguide cable includes a plurality of cylindrical enclosure substantially concentric to the longitudinal axis of the optical waveguide cable. The plurality of cylindrical enclosure includes a predefined cylindrical enclosure. Furthermore, the one or more optical waveguide bands include a plurality of light transmission elements. Moreover, the density of the predefined cylindrical enclosure is at most 0.935 gram per cubic centimeter. Also, the optical waveguide cable has a waveguide area factor about 44%. The one or more optical waveguide bands are coupled longitudinally with the predefined cylindrical enclosure. The predefined cylindrical enclosure is at a predefined diagonal distance of about 0.9 millimeter from the one or more optical waveguide bands.

31 Claims, 3 Drawing Sheets

(56) References Cited

U.S. PATENT DOCUMENTS

2003/0059613 A1\* 3/2003 Tirelli .................... H01B 7/295
                                                                428/375
2013/0084047 A1\* 4/2013 Baucom ............... G02B 6/4404
                                                                385/114

\* cited by examiner

PREDEFINED CYLINDRICAL ENCLOSURE FOR OPTICAL WAVEGUIDE CABLE

TECHNICAL FIELD

The present disclosure relates to the field of an optical waveguide cable. More particularly, the present disclosure relates to the optical waveguide cable for outdoor and underground applications. The present application is based on, and claims priority from an Indian Application Number 201811005501 filed on 14 Feb. 2018 the disclosure of which is hereby incorporated by reference herein.

BACKGROUND

We use many modern technologies for communication in the modern world. Of these the most important one is the optical fiber communication using a variety of optical fiber cables. One such type of optical fiber cables are optical fiber ribbon cables. These optical fiber ribbon cables are installed in ducts. These optical fiber ribbon cables include a plurality of optical fiber ribbons. Each optical fiber ribbon includes a number of optical fibers placed adjacent and bonded together with a matrix material. These optical fiber ribbons may be held inside a central loose tube which may be covered by additional layers such as water blocking layers, armoring layer, sheathing layer and the like. In addition, the optical fiber ribbons may or may not be coupled to the central loose tube. In addition, these optical fiber ribbon cables can be prepped and spliced rapidly through mass fusion splicing. This leads to easy installation, less installation time, low installation cost and the like. Traditionally, these optical fiber ribbon cables do not have any gel present inside the core which reduces preparation time.

SUMMARY

In a first example, an optical waveguide cable is provided. The optical waveguide cable is defined by a longitudinal axis passing through a geometrical center of the optical waveguide cable. The optical waveguide cable includes one or more optical waveguide bands positioned substantially along the longitudinal axis of the optical waveguide cable. Each of the one or more optical waveguide bands includes a plurality of light transmission elements. The plurality of light transmission elements are edge bonded to enable the one or more optical waveguide bands. In addition, the optical waveguide cable includes a plurality of cylindrical enclosure defined by the longitudinal axis of the optical waveguide cable. The plurality of cylindrical enclosure surrounds the one or more optical waveguide bands. The plurality of cylindrical enclosure includes a predefined cylindrical enclosure defined by the longitudinal axis of the optical waveguide cable. The predefined cylindrical enclosure is made of a material having a density of at most 0.935 gram per cubic centimeter. The predefined cylindrical enclosure encapsulates the one or more optical waveguide bands.

In a second example, an optical waveguide cable is provided. The optical waveguide cable is defined by a longitudinal axis passing through a geometrical center of the optical waveguide cable. The optical waveguide cable includes one or more optical waveguide bands positioned substantially along the longitudinal axis of the optical waveguide cable. Each of the one or more optical waveguide bands includes a plurality of light transmission elements. The plurality of light transmission elements are edge bonded to enable the one or more optical waveguide bands. In addition, the optical waveguide cable includes a plurality of cylindrical enclosure defined by the longitudinal axis of the optical waveguide cable. The plurality of cylindrical enclosure surrounds the one or more optical waveguide bands. The plurality of cylindrical enclosure includes a predefined cylindrical enclosure defined by the longitudinal axis of the optical waveguide cable. The predefined cylindrical enclosure encapsulates the one or more optical waveguide bands. The predefined cylindrical enclosure is made of a material having a density of at most 0.935 gram per cubic centimeter. The density is measured at a plurality of conditions. The plurality of conditions comprises a temperature range of about 21 degree Celsius to 25 degree Celsius and a relative humidity of about 40% to 60%. The plurality of conditions is required for at least 40 hours before the density is measured. The density of the predefined cylindrical enclosure is at most 40% of density of the plurality of light transmission elements.

In a third example, an optical waveguide cable is provided. The optical waveguide cable is defined by a longitudinal axis passing through a geometrical center of the optical waveguide cable. The optical waveguide cable includes one or more optical waveguide bands positioned substantially along the longitudinal axis of the optical waveguide cable. Each of the one or more optical waveguide bands includes a plurality of light transmission elements. The plurality of light transmission elements are edge bonded to enable the one or more optical waveguide bands. In addition, the optical waveguide cable includes a plurality of cylindrical enclosure defined by the longitudinal axis of the optical waveguide cable. The plurality of cylindrical enclosure surrounds the one or more optical waveguide bands. The plurality of cylindrical enclosure includes a predefined cylindrical enclosure defined by the longitudinal axis of the optical waveguide cable. The predefined cylindrical enclosure encapsulates the one or more optical waveguide bands. The predefined cylindrical enclosure is made of a material having a density of at most 0.935 gram per cubic centimeter. The density is measured at a plurality of conditions. The plurality of conditions comprises a temperature range of about 21 degree Celsius to 25 degree Celsius and a relative humidity of about 40% to 60%. The plurality of conditions is required for at least 40 hours before the density is measured. The density of the predefined cylindrical enclosure is at most 40% of density of the plurality of light transmission elements. The predefined cylindrical enclosure is made of a material. The material has an environmental stress cracking resistance of at least 500 hour, a tensile strength of about 4000 mega Pascal, a brittleness temperature of at most 100 degree Celsius and a tensile elongation at break of about 1000 percent.

BRIEF DESCRIPTION OF FIGURES

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
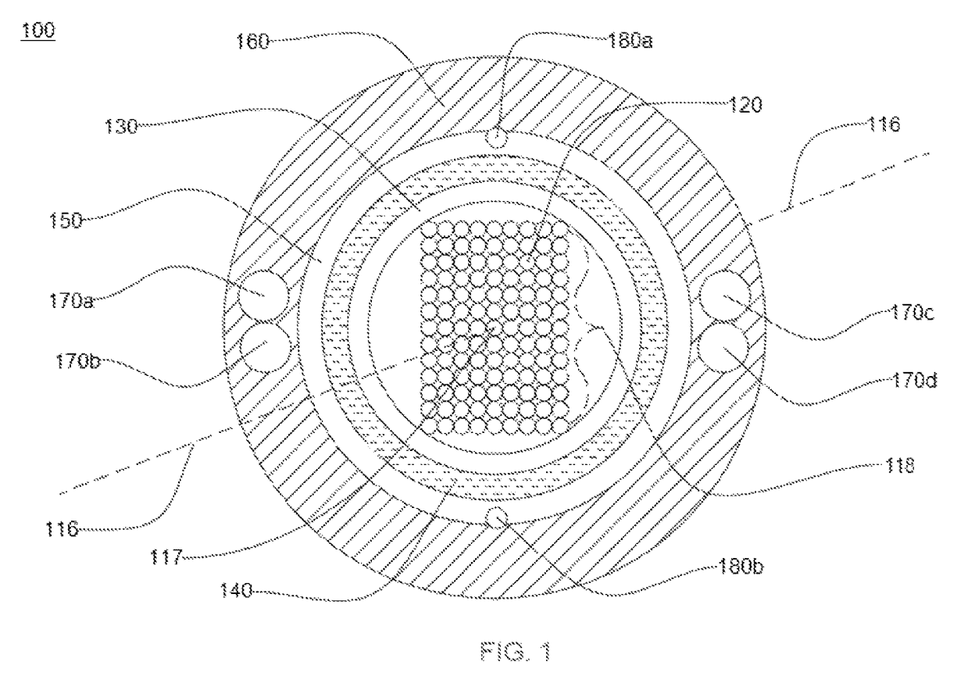
FIG. 1 illustrates a cross sectional view of an optical waveguide cable for outdoor applications, in accordance with an embodiment of the present disclosure.

FIG. 1 illustrates a cross-sectional view of an optical waveguide cable 100 for outdoor applications, in accordance with an embodiment of the present disclosure. The cross sectional view describes a layered structure and distribution of discrete elements of the optical waveguide cable 100. The layered structure of the optical waveguide cable 100 includes one or more optical waveguide bands 118, a first water blocking element 130, a predefined cylindrical enclosure 140, a second water blocking element 150, a protective cover 160. In addition, the optical waveguide cable 100 includes a plurality of robust components 170a-170d, a plurality of tearing strings 180a-180b and a plurality of cylindrical enclosure.

The optical waveguide cable 100 is defined by a longitudinal axis 116 passing through a geometrical center 117 of the optical waveguide cable 100. In general, longitudinal axis corresponds to an imaginary axis passing through geometrical center of an optical waveguide cable. In general, geometrical center corresponds to center point of circular cross sectional geometry of optical waveguide cable. The longitudinal axis 116 is an imaginary axis passing through a geometrical center 117 of the optical waveguide cable 100. In general, optical waveguide cable corresponds to an assembly of one or more optical waveguides typically individually coated with plastic layers and contained in protective covering suitable for the environment where the cable will be installed. The optical waveguide cable 100 is used for communication purposes. In addition, the optical waveguide cable 100 is used for aerial installations, underground installations and the like. Also, the optical waveguide cable 100 is used for broadband applications, communication applications and the like.

The optical waveguide cable 100 includes the one or more optical waveguide bands 118. The one or more optical waveguide bands 118 are positioned substantially along the longitudinal axis 116 of the optical waveguide cable 100. In general, a plurality of light transmission elements 120 are sandwiched, encapsulated, and/or edge bonded to form an optical waveguide band. In general, each of the plurality of light transmission elements 120 in the one or more optical waveguide bands 118 is a light transmission element used for transmitting information as light pulses. The information is transmitted as light pulse from the one end of the optical waveguide cable 100 to another end of the optical waveguide cable 100. In addition, each of the plurality of light transmission elements 120 is a thin strand of glass capable of transmitting optical signals. Also, each of the plurality of light transmission elements 120 is configured to transmit large amounts of information over long distances with relatively low attenuation. In an embodiment of the present disclosure, the plurality of light transmission elements 120 is made of silicon glass. In another embodiment of the present disclosure, the plurality of light transmission elements 120 is made of another material.

In an embodiment of the present disclosure, the number of light transmission elements 120 in the one or more optical waveguide bands 118 is fixed. In another embodiment of the present disclosure, the number of light transmission elements in the one or more optical waveguide 118 bands may vary. Further, a plurality of optical waveguide bands is aggregated to form an optical element. In an example the optical element includes stack of at least two optical waveguide bands. The optical element has various sizes and shapes. In an embodiment of the present disclosure, the fill factor of the one or more optical waveguide bands 118 is about 0.445. In addition, the fill factor of the one or more optical waveguide bands 118 is a ratio of average cross-sectional area of the one or more optical waveguide bands 118 to average cross-sectional area of the predefined cylindrical enclosure 140.

In an embodiment of the present disclosure, the attenuation change of the plurality of light transmission elements 120 is less than 0.05 dB/km in a temperature range from −40 degree Celsius to +70 degree Celsius in a time period of 2 cycles. Each cycle of the 2 cycles includes a time period of 12 hours. In another embodiment of the present disclosure, each of the plurality of light transmission elements 120 has maximum attenuation of about 0.36 dB/Km at a wavelength of about 1310 nanometers at a room temperature. In general, the room temperature is having a range of about 20 degree Celsius to 25 degree Celsius. In yet another embodiment of the present disclosure, each of the plurality of light transmission elements 120 has maximum attenuation of about 0.24 dB/Km at a wavelength of about 1550 nanometers at the room temperature. In yet another embodiment of the present disclosure, each of the plurality of light transmission 120 elements has maximum attenuation of about 0.26 dB/Km at a wavelength of about 1625 nanometers at the room temperature. The attenuation of each of the plurality of light transmission elements 120 correspond to a loss in optical power as the light travels through the plurality of light transmission elements. In an embodiment of the present disclosure, the plurality of light transmission elements in the one or more optical waveguide bands 118 is a single mode light optical transmission element. In another embodiment of the present disclosure, the plurality of light transmission elements 120 in the one or more optical waveguide bands 118 is a multi-mode optical transmission element. In an embodiment of the present disclosure, each of the plurality of light transmission elements has a fill factor of about 0.109. In general, the fill factor of the plurality of light transmission elements 120 is a ratio of average cross-sectional area of the plurality of light transmission elements 120 to average cross-sectional area of the predefined cylindrical enclosure 140.

The optical waveguide cable 100 includes the plurality of cylindrical enclosure. In general, plurality of cylindrical enclosure corresponds to a plurality of covering layers surrounding core region of optical cable. In an embodiment of the present disclosure, the plurality of cylindrical enclosure 140 includes the first water blocking element 130. The first water blocking element 130 surrounds the one or more optical waveguide bands. In general, the water blocking element prevents ingression of water in and around the one or more optical waveguide bands 118. In an example, the first water blocking element 130 is a water swellable tape. In another example, the first water blocking element 130 may include any other water repellant material. Moreover, the first water blocking element 130 has water repellant properties which does not allows the ingression of water in and around the one or more optical waveguide bands 118.

The optical waveguide cable 100 includes the plurality of cylindrical enclosure. In an embodiment of the present disclosure, the plurality of cylindrical enclosure includes the predefined cylindrical enclosure 140 positioned substantially along the longitudinal axis 116 of the optical waveguide cable 100. In general, predefined cylindrical enclosure corresponds to a suitable cylindrical enclosure to encapsulate one or more optical waveguide bands. The predefined cylindrical enclosure 140 surrounds the first water blocking element 130. The predefined cylindrical enclosure 140 encapsulates the one or more optical waveguide bands 118. The predefined cylindrical enclosure 140 provides a sound covering to the one or more optical waveguide bands 118. In addition, the predefined cylindrical enclosure 140 provides mechanical isolation, physical damage protection and identification of one or more optical waveguide bands 118.

In an embodiment of the present disclosure, the predefined cylindrical enclosure 140 is made of a material. The material has a density of about 0.935 gram per cubic centimeter of the predefined cylindrical enclosure 140. The predefined cylindrical enclosure 140 with a density of about 0.935 gram per cubic centimeter induces flexibility in the predefined cylindrical enclosure 140. The flexibility of predefined cylindrical enclosure 140 is important for easy storing of cylindrical enclosures inside the joint closures. In addition, the material provides an environmental stress cracking resistance of at least 500 hour to the predefined cylindrical enclosure 140. In general, the environmental stress cracking resistance corresponds to the ability of the material to resist the environmental stress cracking in the optical waveguide cable. Further, the material used for the predefined cylindrical enclosure 140 has a melt mass flow rate of about 0.70 gram per 10 minute. In general, the melt mass flow rate is an indication of the viscosity of the material in the melt phase. In addition, the melt mass flow rate is the rate of flow of mass of the material per 10 minutes through a capillary when a pressure is applied on capillary at a specific temperature. Further, the melt mass flow rate is a measure of the ability of the material's melt to flow under pressure. In addition, the material provides a tensile strength of about 4000 mega Pascal to the predefined cylindrical enclosure 140. In general, tensile strength corresponds to the resistance of a material to breaking under tension. The tensile strength corresponds to a resistance shown by the optical waveguide cable 100 against regaining elastic nature when tension is applied. In an embodiment of the present disclosure, the material of the predefined cylindrical enclosure 140 is medium density polyethylene. In another embodiment of the present disclosure, the predefined cylindrical enclosure 140 is made of any suitable material of the like. Further, the predefined cylindrical enclosure 140 has a brittleness temperature of at most 100 degree Celsius. In general, the brittle temperature may be defined as the temperature at which 50% of the specimens fail. The predefined cylindrical enclosure 140 has a kink radius of about 4 D millimeter, where D is diameter of predefined cylindrical enclosure 140. The kink radius corresponds to the minimum radius of the predefined cylindrical enclosure 140 to bend without kinking or damaging the predefined cylindrical enclosure 140. The predefined cylindrical enclosure 140 is characterized by a tensile elongation of about 1000 percent. The tensile elongation is defined as the strain at break. In addition, tensile elongation is defined as the percent change in length at break. These properties enable the predefined cylindrical enclosure 140 to have a life of more than 25 years. In another embodiment of the present disclosure; the predefined cylindrical enclosure 140 is made from a material selected from the group. The group includes thermoplastic material, polyethylene material and low smoke zero halogen. In another embodiment of the present disclosure, the predefined cylindrical enclosure 140 is made from any suitable metallic material. In yet another embodiment of the present disclosure, the predefined cylindrical enclosure 140 is made of any other suitable material.

In an embodiment of the present disclosure, the plurality of cylindrical enclosure includes a single predefined cylindrical enclosure 140. In addition, the predefined cylindrical enclosure 140 is made of at least one layer. Further, the at least one layer is made of homogeneous material. In general, the homogeneous material represents the material having a uniform composition throughout the area. In an example, the homogeneous material include but may not be limited to High Density Polyethylene, polypropylene, medium density polyethylene, polyvinyl chloride, Low density polyethylene and polyethylene or ethylene vinyl acetate (EVA) base Low smoke zero halogen. In another embodiment of the present disclosure, the at least one layer is made of a combination of a plurality of materials. In an example, the material include but may not be limited to High Density Polyethylene, polypropylene, medium density polyethylene, polyvinyl chloride, Low density polyethylene and polyethylene base low smoke zero halogen and ethylene vinyl acetate (EVA) base Low smoke zero halogen. In an embodiment of the present disclosure, the predefined cylindrical enclosure 140 is constructed from an extruded polymeric material. In addition, the polymeric material is selected from the group. The group includes High Density Polyethylene, polyethylene terephthalate, polypropylene, polyethylene; polyvinyl chloride, Low density polyethylene, polyethylene base Low smoke zero halogen and ethylene vinyl acetate (EVA) base low smoke zero halogen. In another embodiment of the present disclosure, the predefined cylindrical enclosure 140 is constructed from a pultruded fiber reinforced plastic material. In an embodiment of the present disclosure, the predefined cylindrical enclosure 140 may include a material to provide high temperature and chemical resistance. In an example, the predefined cylindrical enclosure 140 may include an aromatic material or polysulfone material. In another example, the predefined cylindrical enclosure 140 may include any other suitable material.

The predefined cylindrical enclosure 140 is characterized by a first diameter and a second diameter. In an embodiment of the present disclosure, the first diameter and the second diameter of the predefined cylindrical enclosure 140 is fixed when the number of light transmission elements is fixed. In an example, the first diameter of the predefined cylindrical enclosure 140 is about 8.0 millimeter and the second diameter of the predefined cylindrical enclosure 140 is about 6.4 millimeter. In another embodiment of the present disclosure, the first diameter and the second diameter of the predefined cylindrical enclosure 140 may vary according to the change in number of the light transmission elements inside the optical waveguide cable 100.

In an embodiment of the present disclosure, the density of the predefined cylindrical enclosure 140 is less than 0.935 gram per cubic centimeter. The density of the predefined cylindrical enclosure 140 is calculated based on the plurality of conditions. The plurality of conditions includes a temperature range of about 21 degree Celsius to 25 degree Celsius. In addition, the plurality of conditions includes a relative humidity of about 40% to 60%. Further, the plurality of conditions is required for at least 40 hours before the test to find out the density of the predefined cylindrical enclosure 140. In general, relative humidity is defined as the amount of water vapour present in air expressed as a percentage of the amount needed for saturation at the same temperature. The above mentioned conditions are considered as base points to measure the density. In addition, the predefined cylindrical enclosure 140 has the density of at most 40% of the density of bare silicon glass light transmission element at a temperature of about 25±3 degree Celsius. Further, the predefined cylindrical enclosure 140 has the density of at most 40% of the density of the plurality of light transmission elements 120.

In an embodiment of the present disclosure, the predefined cylindrical enclosure 140 is dry. The dry predefined cylindrical enclosure 140 represents the predefined cylindrical enclosure without any gel. The dry predefined cylindrical enclosure 140 facilitates easy splicing of the optical waveguide cable 100. The splicing does not require any cleaning agents to dissolve greasy filling compounds inside the optical waveguide cable 100. Thus, reduces the overall installation/midspan time. In another embodiment of the present disclosure, the predefined cylindrical enclosure 140 includes a filling gel. The filling gel prevents ingression of water inside the predefined cylindrical enclosure 140. In an example, the predefined cylindrical enclosure 140 requires less amount of gel which reduces messiness and clean up time during the installation process of the optical waveguide cable 100. In an example, the filling gel is a thixotropic gel.

In an embodiment of the present disclosure, the optical waveguide cable 100 has a waveguide area factor of about 44%. The waveguide area factor is defined as a ratio of the average cross sectional area of the one or more optical waveguide bands 118 with the average cross sectional area of the predefined cylindrical enclosure 140. The average cross sectional area of the one or more optical waveguide bands 118 and the average cross sectional area of the predefined cylindrical enclosure 140 define a ratio of about 0.40. In addition, the average cross sectional area of one or more optical waveguide bands 118 represents about 40% of the average cross sectional area of the predefined cylindrical enclosure 140.

The one or more optical waveguide bands 118 are coupled longitudinally with the plurality of cylindrical enclosure. The coupling of the one or more optical waveguide bands 118 with the plurality of cylindrical enclosure is defined by at least one corner of the one or more optical waveguide bands 118 and the plurality of cylindrical enclosure. In addition, the at least one corner of the one or more optical waveguide bands 118 is coupled with the plurality of cylindrical enclosure along the longitudinal axis 116. In an example, the first water blocking element 130 provides coupling of the predefined cylindrical enclosure 140 with the one or more optical waveguide bands 118. The first water blocking element 130 positioned in between the predefined cylindrical enclosure 140 and the one or more optical waveguide bands 118. The coupling restricts the movement of the one or more optical waveguide bands 118 inside the plurality of cylindrical enclosure as a result of processing, installation and handling. In addition, the coupling prevents the undesirable effects of signal loss. Further, the one or more optical waveguide bands 118 are coupled longitudinally with the plurality of cylindrical enclosure to prevent displacement of the optical waveguide band, when a force is applied to install the cable.

In an embodiment of the present disclosure, the optical waveguide cable 100 includes a second water blocking element 150. The second water blocking element 150 is used to prevent ingression of water and moisture in and around the predefined cylindrical enclosure 140 of the optical waveguide cable 100. In addition, the second water blocking element 150 is used for inhibiting the migration of water along the optical waveguide cable 100. In an example, the second water blocking element 150 includes water swellable tape. In another example the second water blocking element 150 is any other water repellant material. Moreover, the second water blocking element 150 has water repellant properties which does not allows the ingression of water in and around the predefined cylindrical enclosure 140.

The optical waveguide cable 100 includes a protective cover 160. In an example, the protective cover 160 may be a sheath or a jacket. In an embodiment of the present disclosure, the protective cover 160 is made of a medium density polyethylene material. The medium density polyethylene material of the protective cover 160 has a density of about 0.935 gram per cubic centimeter. In addition, the medium density polyethylene material provides an environmental stress cracking resistance of at least 500 hour to the protective cover 160. In general, the environmental stress cracking resistance corresponds to the ability of the medium density polyethylene material to resist the environmental stress cracking in the optical waveguide cable. Further, the medium density polyethylene material of the used for the protective cover 160 has a melt mass flow rate of about 0.70 gram per 10 minute. In an embodiment of the present disclosure, the melt mass flow rate is an indication of the viscosity of the medium density polyethylene material in the melt phase. In addition, the melt mass flow rate is the rate of flow of mass of the medium density polyethylene material per 10 minutes through a capillary when a pressure is applied on capillary at a specific temperature. Further, the melt mass flow rate is a measure of the ability of the material's melt to flow under pressure. In addition, the medium density polyethylene material provides a tensile strength of about 4000 mega Pascal to the protective cover 160. The tensile strength corresponds to a resistance shown by the optical waveguide cable 100 against regaining elastic nature when tension is applied. Further, the protective cover 160 has a brittleness temperature of at most 100 degree Celsius. The protective cover 160 is characterized by a tensile elongation at break of about 1000 percent. In general, tensile elongation at break corresponds to a ratio between changed length and initial length after breakage of the test specimen. The tensile elongation at break expresses the capability of a material to resist changes of shape without crack formation. The tensile elongation is defined as the strain at break. In addition, tensile elongation is defined as the percent change in length at break.

In another embodiment of the present disclosure, the protective cover 160 is made of a material selected from the group. The group includes Low smoke zero halogen, polyethylene, polyamides, polypropylene, UV proof black polyethylene, UV proof high density polyethylene and UV proof low density polyethylene. In another embodiment of the present disclosure, the protective cover 160 is made of any other suitable material.

The protective cover 160 improves the mechanical performance of the optical waveguide cable 100. In addition, the protective cover 160 protects the optical waveguide cable 100 against crush, bend and tensile stress along the length of the optical waveguide cable 100. Further, the protective cover 160 provides ultraviolet protection to the optical waveguide cable 100 for outdoor purposes.

In an embodiment of the present disclosure, the plurality of cylindrical enclosure may include specific layers to attain specific properties for the optical waveguide cable 100. In an example, the plurality of cylindrical enclosure includes a layer of fire resistance tape to protect the optical waveguide cable 100 against fire. In another example, the plurality of cylindrical enclosure includes an armor layer of corrugated ECCS tape to limit the signal attenuation during fire. In yet another example, the plurality of cylindrical enclosure include a layer of glass roving yarns to protect various elements inside the predefined cylindrical enclosure 140 of the optical waveguide cable 100 against the crush resistance and kinks. In yet another example, the plurality of cylindrical enclosure includes a layer of binder yarns for binding of cables under the protective cover 160. In yet another example, the plurality of cylindrical enclosure includes a layer of aramid yarns to meet the tensile strength of the optical waveguide cable 100. In yet another embodiment of the present disclosure, the plurality of cylindrical enclosure is selected from a group. The group includes but may not be limited to fire resistance tape layer, water swellable tape layer, armor layer, glass roving yarn layer, binder yarn layer and aramid yarn layer.

In an embodiment of the present disclosure, the optical waveguide cable 100 includes a plurality of robust components 170a-170d. In an embodiment of the present disclosure, each of the plurality of robust components 170a-170d is embedded inside the protective cover 160. The plurality of robust components 170a-170d provides strength and minimizes shrinkage during temperatures variations. In an example, the plurality of robust components 170a-170d includes a first pair of robust components 170a-170b and a second pair of robust component 170c-170d. The first pair of robust component 170a-170b is diagonally opposite to the second pair of robust component 170c-170d which results in symmetrical bending. The first pair of robust component 170a-170b includes robust component 170a and the robust component 170b and the robust component 170a and the robust component 170b touch each other. The second pair of robust component 170c-170d includes robust component 170c and the robust component 170d and the robust component 170c and the robust component 170d touch each other. In addition, the size of the first pair of robust components and the second pair of robust components is equal. The plurality of robust components 170a-170d acts as anti-buckle or anti-shrink elements for the optical waveguide cable 100. In an embodiment of the present disclosure, each of the plurality of robust components 170a-170d is circular in cross section. In general, the plurality of robust components 170a-170d is used to achieve the environmental and tensile requirements. In addition, the plurality of robust components 170a-170d is used to restrict shrinkage of the optical waveguide cable 100 during thermal cycling. Moreover, the plurality of robust components 170a-170d provides robustness and tensile strength to the optical waveguide cable 100. Further, the closeness of the robust components 170a-170b induces better flexibility to the optical waveguide cable. Similarly, the closeness of the robust components 170c-170d induces better flexibility to the optical waveguide cable. The optical waveguide cable is optimized for flexibility and bending by keeping the distance minimum between the first robust component and second robust component of both the pairs of robust components which leads to easy process. In an embodiment of the present disclosure, the plurality of robust components 170a-170d is made of a material selected from the group. The group includes Fiber reinforced plastic and steel wires. In another embodiment of the present disclosure, the plurality of robust components 170a-170d is made of any other suitable material.

The optical waveguide cable 100 includes a plurality of tearing strings 180a-180b. The plurality of tearing strings 180a-180b is present below the protective cover 160. Further, the plurality of tearing strings 180a-180b includes first tearing string 180a and the second tearing string 180b. In an embodiment of the present disclosure, the first tearing string 180a is diagonally opposite to the second tearing string 180b. In addition, the plurality of tearing strings 180a-180b lies substantially along the longitudinal axis 116 of the optical waveguide cable 100. In an embodiment of the present disclosure, the plurality of tearing strings 180a-180b facilitates stripping of the plurality of cylindrical enclosure. In an embodiment of the present disclosure, the plurality of tearing strings 180a-180b is made of a polyester material. In another embodiment of the present disclosure, the plurality of tearing strings 180a-180b is made of any other suitable materials. In addition, each of the plurality of tearing strings 180a-180b has a circular cross-section. In an embodiment of the present disclosure, the optical waveguide cable 100 has a weight of about 150 kg/kilometer. In an embodiment of the present disclosure, the optical waveguide cable 100 has a diameter of about 15 kilometers. In another embodiment of the present disclosure, the optical waveguide cable 100 may have any suitable value of weight and diameter.

In an embodiment of the present disclosure, the optical waveguide cable 100 has a short term tensile strength of about 2700 Newton and long term tensile strength of about 900 Newton. In an embodiment of the present disclosure, the minimum bending radius of the optical waveguide cable 100 during installation is 20 D and during operation is 15 D. In an embodiment of the present disclosure, the crush resistance of the optical waveguide cable 100 is about 4000 Newton per 100 millimeter. In an embodiment of the present disclosure, the impact strength of the optical waveguide cable 100 is 25 Newton meter. In an embodiment of the present disclosure, the torsion of the optical waveguide cable 100 is ±180 degree. In another embodiment of the present disclosure, the optical waveguide cable 100 has any suitable value or range of crush resistance, impact strength, torsion, tensile strength, minimum bending radius and temperature performance.

Figure 2:
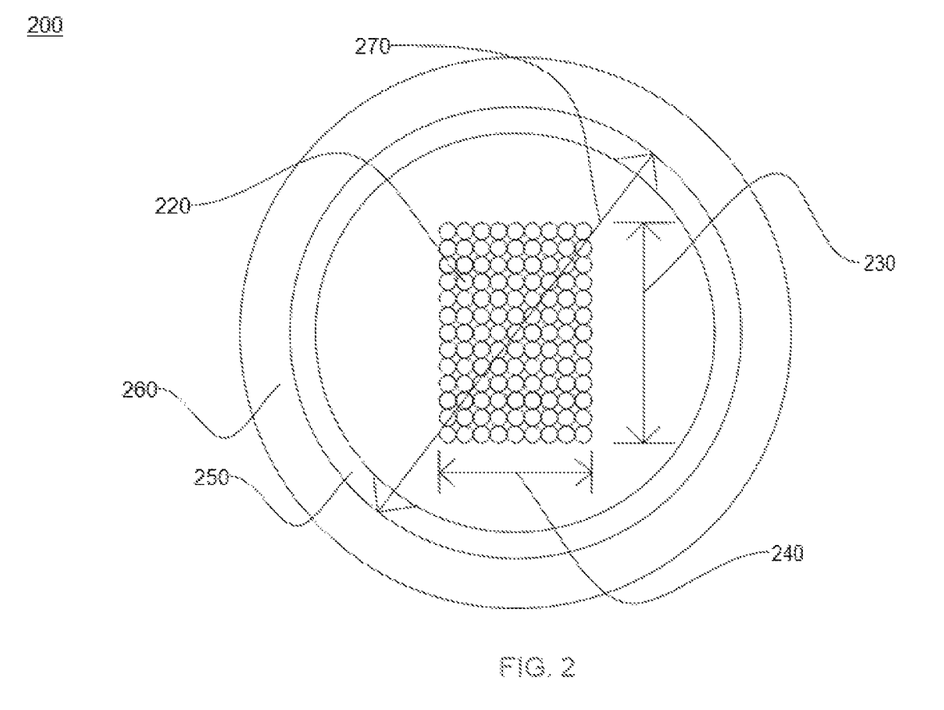
FIG. 2 illustrates a cross sectional view of an optical waveguide cable with a waveguide factor, in accordance with another embodiment of the present disclosure.

FIG. 2 illustrate a cross sectional view of an optical waveguide cable 200 with an optical waveguide factor in accordance with another embodiment of the present disclosure. In an embodiment of the present disclosure, the optical waveguide cable 200 includes one or more optical elements 220. The one or more optical elements 220 include one or more optical waveguide bands. In addition, the one or more optical elements 220 are the stack of the one or more optical waveguide bands. In an example, the one or more optical elements include at least two optical waveguide bands. Each optical waveguide band includes a plurality of light transmission elements 120. The plurality of light transmissions elements 120 are edge bonded to enable the optical waveguide band. The one or more optical elements 220 have an average cross sectional area defined by average height 230 and average width 240. In addition, the optical waveguide cable 200 includes a water blocking element 250. In an embodiment of the present disclosure, the water blocking element 250 is a water blocking tape. The water blocking element 250 surrounds the one or more optical elements 220. Further, the optical waveguide cable 200 includes a predefined cylindrical enclosure 260. The predefined cylindrical enclosure 260 surrounds the water blocking element 250. The water blocking element 250 is used to prevent ingression of water in and around the one or more optical elements 220. The predefined cylindrical enclosure 260 has an average cross sectional first area defined by a first diameter 270 of the predefined cylindrical enclosure 260. The first area is the inner area and the first diameter is the inner diameter of the predefined cylindrical enclosure 260. In general, the predefined cylindrical enclosure 260 has a circular profile. The average cross sectional first area of the predefined cylindrical enclosure 260 is calculated by using the formula for area of a circle. The formula used to find the area of circle is pi*radius*radius. The radius of the predefined cylindrical enclosure 260 is half of the first diameter 270. The value of pi is defined as 3.14. The average cross sectional first area of the predefined cylindrical enclosure 260 and the average cross sectional area of the one or more optical elements 220 define a ratio of about 0.40. In addition, the average cross sectional area of the one or more optical elements 220 represents about 40% of the average cross sectional first area of the predefined cylindrical enclosure 260.

Figure 3:
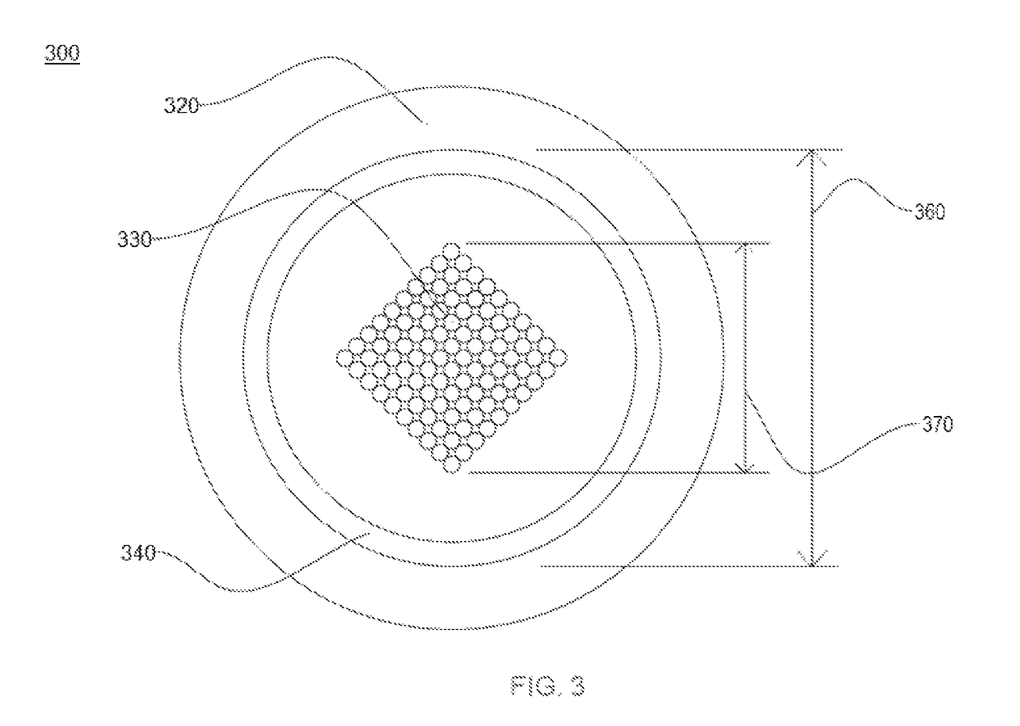
FIG. 3 illustrates across sectional view of an optical waveguide cable having a predefined diagonal distance of one or more optical waveguide bands, in accordance with yet another embodiment of the present disclosure.

FIG. 3 illustrates a cross sectional view of an optical waveguide cable 300 with a predefined cylindrical enclosure 320 in accordance with yet another embodiment of the present disclosure. The predefined cylindrical enclosure 320 includes an optical element 330. Further, the optical element 330 includes one or more optical waveguide bands. In general, the optical element 330 is a stack of the one or more optical waveguide bands. Moreover, each optical waveguide band includes a plurality of light transmission elements. Further, the optical waveguide cable 300 includes a water blocking element 340 in between the optical element 330 and the predefined cylindrical enclosure 320. The water blocking tape 340 is used to prevent ingression of water in and around the optical element 330.

In an example, the optical element 330 includes 10 optical waveguide bands. Further, each optical waveguide band includes 10 light transmission elements. The total number of light transmission element present in the optical element 330 is 100(10*10=100). In another example, the optical element 330 may include any number of optical waveguide bands and each optical waveguide band may include any number of light transmission element. In an embodiment of the present disclosure, the predefined cylindrical enclosure 320 has a specified first diameter. The first diameter is the inner diameter of the predefined cylindrical enclosure 320. In addition, the optical element 330 has a specified diagonal length. The first diameter of the predefined cylindrical enclosure 320 is more than the diagonal length of the optical element 330.

In an example, the first diameter 360 of the predefined cylindrical enclosure 320 is D and the diagonal length 370 of the optical element 330 is d. The predefined cylindrical enclosure 320 is at a predefined diagonal distance from the one or more optical element 330. The predefined cylindrical enclosure 320 is at the predefined diagonal distance of 0.9 millimeter from the one or more optical element 330. The diagonal distance is the minimum distance between the predefined cylindrical enclosure 320 and the optical element 330. The predefined diagonal distance of the optical waveguide cable 300 is defined by a distance of 0.9 millimeter (D−d=0.9). The predefined diagonal distance defines the quality of the optical waveguide cable 300. In another example, the predefined diagonal distance may vary in the optical waveguide cable 300 according to the increase or decrease in number of light transmission element. In an embodiment of the present disclosure, the predefined cylindrical enclosure 320 is at the predefined diagonal distance of about 0.9 millimeter from the diagonal end of the optical element 330. In another embodiment of the present disclosure, the predefined cylindrical enclosure 320 is at any suitable predefined diagonal distance from the diagonal end of the optical element 330.

The predefined cylindrical enclosure (disclosed above in the patent application) is significant because of the properties of the predefined cylindrical enclosure. The predefined cylindrical enclosure disclosed above with a density of about 0.935 gram per cubic centimeter induces flexibility in the predefined cylindrical enclosure. The flexibility of predefined cylindrical enclosure is important for easy storing of cylindrical enclosures inside the joint closures. Further, the density of the predefined cylindrical enclosure is measured at the plurality of conditions including temperature and humidity (as explained in detail above in the patent application). Furthermore, the predefined cylindrical enclosure disclosed above has an environmental stress cracking resistance of at least 500 hour, a tensile strength of about 4000 mega Pascal, a brittleness temperature of at most 100 degree Celsius and a tensile elongation at break of about 1000 percent which enables the predefined cylindrical enclosure to have a life of more than 25 years. Furthermore, the fill factor has been optimized in the above disclosed predefined cylindrical enclosure which eliminates attenuation problems and prevents bulkiness of overall cable and in turn decreases chances of water penetration inside the predefined cylindrical enclosure and optical fiber cable.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An optical waveguide cable defined by a longitudinal axis passing through a geometrical center of the optical waveguide cable, the optical waveguide cable comprising:
   one or more optical waveguide bands positioned substantially along the longitudinal axis of the optical waveguide cable, wherein each of the one or more optical waveguide bands having a plurality of light transmission elements;
   a plurality of cylindrical enclosures substantially concentric to the longitudinal axis of the optical waveguide cable, wherein the plurality of cylindrical enclosures is defined by the longitudinal axis, wherein the plurality of cylindrical enclosure surround the one or more optical waveguide bands, wherein the plurality of cylindrical enclosure comprising:
   a predefined cylindrical enclosure encapsulating the one or more optical waveguide bands, wherein the predefined cylindrical enclosure includes a filling gel, wherein the predefined cylindrical enclosure is made of a material having a density of at most 0.935 gram per cubic centimeter;
   a protective cover; and
   a first pair of robust components and a second pair of robust components circular in cross-section, embedded in the protective cover, wherein the first pair of robust components and a second pair of robust components are diagonally opposite to each other, wherein each robust component of the first pair of robust components touches each other, and wherein each robust component of the second pair of robust components touches each other.

2. The optical waveguide cable as claimed in claim 1, wherein a melt mass-flow rate of 0.70 gram per 10 minutes and wherein the predefined cylindrical enclosure has a kink radius of 4D.

3. The optical waveguide cable as claimed in claim 1, wherein the density is measured at a plurality of conditions, wherein the plurality of conditions comprises a temperature range of 21 degree Celsius to 25 degree Celsius and a relative humidity of 40% to 60%, wherein the plurality of conditions are required for at least 40 hours before the density of the predefined cylindrical enclosure is measured and wherein the density of the predefined cylindrical enclosure is at most 40% of density of the plurality of light transmission elements.

4. The optical waveguide cable as claimed in claim 1, further comprising a water blocking element surrounding the one or more optical waveguide bands to prevent ingression of water in and around the one or more optical waveguide bands.

5. The optical waveguide cable as claimed in claim 1, wherein the predefined cylindrical enclosure is made of the material, wherein the material has an environmental stress cracking resistance of at least 500 hour, a tensile strength of 4000 mega Pascal, a brittleness temperature of at most 100 degree Celsius and a tensile elongation at break of about 1000 percent.

6. The optical waveguide cable as claimed in claim 1, wherein the one or more optical waveguide bands are defined by a waveguide area factor of 44% and wherein the waveguide factor is a ratio of average cross-sectional area of the one or more optical waveguide bands to average cross-sectional area of the predefined cylindrical enclosure, wherein the one or more optical waveguide bands are coupled longitudinally with the predefined cylindrical enclosure, and wherein at least one corner of the one or more optical waveguide bands are coupled with the plurality of cylindrical enclosure.

7. The optical waveguide cable as claimed in claim 1, wherein the protective cover is made of a medium density polyethylene material, wherein the medium density polyethylene material has a density of 0.935 gram per cubic centimeter, a melt mass flow rate of 0.70 gram per 10 minute, an environmental stress cracking resistance of at least 500 hour, a tensile strength of 4000 mega Pascal, a brittleness temperature of at most 100 degree Celsius, and a tensile elongation at break of 1000 percent.

8. The optical waveguide cable as claimed in claim 1, wherein the plurality of cylindrical enclosure are selected from a group comprising a fire resistance tape, a water swellable tape layer, an ECCS armor layer, a glass roving yarn layer, a binder yarn layer and an aramid yarn layer.

9. The optical waveguide cable as claimed in claim 1, wherein the predefined cylindrical enclosure is at a predefined diagonal distance of 0.9 millimeter from the one or more optical waveguide bands.

10. The optical waveguide cable as claimed in claim 1, wherein the plurality of light transmission elements has an attenuation change of at most 0.05 dB/km at a wavelength of 1550 nanometer at a temperature range of −40 degree Celsius to +70 degree Celsius in a time period of 2 cycles with 12 hours per cycle, wherein the plurality of light transmission elements has a maximum attenuation of 0.36 dB/km at a wavelength of 1310 nanometers at a temperature range of 20 degree Celsius to 25 degree Celsius, wherein the plurality of light transmission elements has a maximum attenuation of 0.24 dB/km at a wavelength of 1550 nanometers at the temperature range of 20 degree Celsius to 25 degree Celsius, wherein the plurality of light transmission elements has a maximum attenuation of 0.26 dB/km at a wavelength of 1625 nanometers at the temperature range of 20 degree Celsius to 25 degree Celsius.

11. The optical waveguide cable as claimed in claim 1, wherein the predefined cylindrical enclosure is made of the material selected from a group comprising Low smoke zero halogen, polyethylene, polyamides, polypropylene, UV proof black polyethylene, UV proof high density polyethylene and UV proof low density polyethylene.

12. The optical waveguide cable as claimed in claim 1, wherein the plurality of light transmission elements has a fill factor of 0.109.

13. The optical waveguide cable as claimed in claim 1, wherein the predefined cylindrical enclosure is made of at least one layer, wherein the at least one layer is made of one of:
   a. a homogeneous material; and
   b. a combination of a plurality of materials.

14. The optical waveguide cable as claimed in claim 1, wherein the plurality of light transmission elements is edge bonded to enable the one or more optical waveguide bands.

15. The optical waveguide cable as claimed in claim 1, wherein the first pair of robust components and the second pair of robust components are made of one of Fiber reinforced plastic or steel wires.

16. The optical waveguide cable as claimed in claim 1, wherein the plurality of cylindrical enclosure further comprises a plurality water blocking elements.

17. An optical waveguide cable defined by a longitudinal axis passing through a geometrical center of the optical waveguide cable, the optical waveguide cable comprising:
   one or more optical waveguide bands having a fill factor of 0.445 positioned substantially along the longitudinal axis of the optical waveguide cable, wherein each of the one or more optical waveguide bands having a plurality of light transmission elements;
   a plurality of cylindrical enclosure substantially concentric to the longitudinal axis of the optical waveguide cable, wherein the plurality of cylindrical enclosures is defined by the longitudinal axis, wherein the plurality of cylindrical enclosure surround the one or more optical waveguide bands, wherein the plurality of cylindrical enclosure comprising:
   a predefined cylindrical enclosure encapsulating the one or more optical waveguide bands, wherein the predefined cylindrical enclosure includes a filling gel, wherein the predefined cylindrical enclosure is made of a material having a density of at most 0.935 gram per cubic centimeter, wherein the density is measured at a plurality of conditions, wherein the plurality of conditions comprises a temperature range of 21 degree Celsius to 25 degree Celsius and a relative humidity of 40% to 60%, wherein the plurality of conditions are required for at least 40 hours before the density is measured and wherein the density of the predefined cylindrical enclosure is at most 40% of density of the plurality of light transmission elements; and further characterized by a first diameter and a second diameter that vary according to a change in a number of the light transmission elements;
   a protective cover; and
   a first pair of robust components and a second pair of robust components circular in cross-section, embedded in the protective cover, wherein the first pair of robust components and a second pair of robust components are diagonally opposite to each other, wherein each robust component of the first pair of robust components touches each other, and wherein each robust component of the second pair of robust components touches each other.

18. The optical waveguide cable as claimed in claim 17, wherein the predefined cylindrical enclosure is made of the material, wherein the material has an environmental stress cracking resistance of at least 500 hour, a tensile strength of 4000 mega Pascal, a brittleness temperature of at most 100 degree Celsius and a tensile elongation at break of 1000 percent.

19. The optical waveguide cable as claimed in claim 17, wherein the one or more optical waveguide bands are defined by a waveguide area factor of 44% and wherein the waveguide factor is a ratio of average cross-sectional area of the one or more optical waveguide bands to average cross-sectional area of the predefined cylindrical enclosure, wherein the one or more optical waveguide bands are coupled longitudinally with the predefined cylindrical enclosure, and wherein at least one corner of the one or more optical waveguide bands are coupled with the plurality of cylindrical enclosure.

20. The optical waveguide cable as claimed in claim 17, wherein the protective cover is made of a medium density polyethylene material, wherein the medium density polyethylene material has a density of 0.935 gram per cubic centimeter, a melt mass flow rate of 0.70 gram per 10 minute, an environmental stress cracking resistance of at least 500 hour, a tensile strength of 4000 mega Pascal, a brittleness temperature of at most 100 degree Celsius, and a tensile elongation at break of 1000 percent.

21. The optical waveguide cable as claimed in claim 17, wherein the predefined cylindrical enclosure is at a predefined diagonal distance of 0.9 millimeter from the one or more optical waveguide bands.

22. The optical waveguide cable as claimed in claim 17, wherein the plurality of light transmission elements has an attenuation change of at most 0.05 dB/km at a wavelength of 1550 nanometer at a temperature range of −40 degree Celsius to +70 degree Celsius in a time period of 2 cycles with 12 hours per cycle, wherein the plurality of light transmission elements has a maximum attenuation of 0.36 dB/km at a wavelength of 1310 nanometers at a temperature range of 20 degree Celsius to 25 degree Celsius, wherein the plurality of light transmission elements has a maximum attenuation of 0.24 dB/km at a wavelength of 1550 nanometers at the temperature range of 20 degree Celsius to 25 degree Celsius, wherein the plurality of light transmission elements has a maximum attenuation of 0.26 dB/km at a wavelength of 1625 nanometers at the temperature range of 20 degree Celsius to 25 degree Celsius.

23. The optical waveguide cable as claimed in claim 17, wherein the predefined cylindrical enclosure is made of the material selected from a group comprising Low smoke zero halogen, polyethylene, polyamides, polypropylene, UV proof black polyethylene, UV proof high density polyethylene and UV proof low density polyethylene.

24. The optical waveguide cable as claimed in claim 17, wherein the plurality of light transmission elements has a fill factor of 0.109.

25. An optical waveguide cable defined by a longitudinal axis passing through a geometrical center of the optical waveguide cable, the optical waveguide cable comprising:
   one or more optical waveguide bands having a fill factor of 0.445 positioned substantially along the longitudinal axis of the optical waveguide cable, wherein each of the one or more optical waveguide bands having a plurality of light transmission elements;
   a plurality of cylindrical enclosure substantially concentric to the longitudinal axis of the optical waveguide cable, wherein the plurality of cylindrical enclosures is defined by the longitudinal axis, wherein the plurality of cylindrical enclosure surround the one or more optical waveguide bands, wherein the plurality of cylindrical enclosure comprising:
   a predefined cylindrical enclosure encapsulating the one or more optical waveguide bands, wherein the predefined cylindrical enclosure includes a filling gel, wherein the predefined cylindrical enclosure is made of a material having a density of at most 0.935 gram per cubic centimeter, wherein the density is measured at a plurality of conditions, wherein the plurality of conditions comprises a temperature range of 21 degree Celsius to 25 degree Celsius and a relative humidity of 40% to 60%, wherein the plurality of conditions are required for at least 40 hours before the density is measured and wherein the density of the predefined cylindrical enclosure is at most 40% of the plurality of light transmission elements, and wherein the material has an environmental stress cracking resistance of at least 500 hour, a tensile strength of 4000 mega Pascal, a brittleness temperature of at most 100 degree Celsius and a tensile elongation at break of 1000 percent and further characterized by a first diameter and a second diameter that vary according to a change in a number of the light transmission elements;

a protective cover; and a first pair of robust components and a second pair of robust components circular in cross-section, embedded in the protective cover, wherein the first pair of robust components and a second pair of robust components are diagonally opposite to each other, wherein each robust component of the first pair of robust components touches each other, and wherein each robust component of the second pair of robust components touches each other.

26. The optical waveguide cable as claimed in claim 25, wherein the one or more optical waveguide bands are defined by a waveguide area factor of 44% and wherein the waveguide factor is a ratio of average cross-sectional area of the one or more optical waveguide bands to average cross-sectional area of the predefined cylindrical enclosure wherein the one or more optical waveguide bands are coupled longitudinally with the predefined cylindrical enclosure, and wherein at least one corner of the one or more optical waveguide bands are coupled with the plurality of cylindrical enclosure.

27. The optical waveguide cable as claimed in claim 25, wherein the protective cover is made of a medium density polyethylene material, wherein the medium density polyethylene material has a density of 0.935 gram per cubic centimeter, a melt mass flow rate of 0.70 gram per 10 minute, an environmental stress cracking resistance of at least 500 hour, a tensile strength of 4000 mega Pascal, a brittleness temperature of at most 100 degree Celsius, and a tensile elongation at break of 1000 percent.

28. The optical waveguide cable as claimed in claim 25, wherein the predefined cylindrical enclosure is at a predefined diagonal distance of 0.9 millimeter from the one or more optical waveguide bands.

29. The optical waveguide cable as claimed in claim 25, wherein the plurality of light transmission elements has an attenuation change of at most 0.05 dB/km at a wavelength of 1550 nanometer at a temperature range of −40 degree Celsius to +70 degree Celsius in a time period of 2 cycles with 12 hours per cycle, wherein the plurality of light transmission elements has a maximum attenuation of 0.36 dB/km at a wavelength of 1310 nanometers at a temperature range of 20 degree Celsius to 25 degree Celsius, wherein the plurality of light transmission elements has a maximum attenuation of 0.24 dB/km at a wavelength of 1550 nanometers at the temperature range of 20 degree Celsius to 25 degree Celsius, wherein the plurality of light transmission elements has a maximum attenuation of 0.26 dB/km at a wavelength of 1625 nanometers at the temperature range of 20 degree Celsius to 25 degree Celsius.

30. The optical waveguide cable as claimed in claim 25, wherein the predefined cylindrical enclosure is made of the material selected from a group comprising Low smoke zero halogen, polyethylene, polyamides, polypropylene, UV proof black polyethylene, UV proof high density polyethylene and UV proof low density polyethylene.

31. The optical waveguide cable as claimed in claim 25, wherein the plurality of light transmission elements has a fill factor of 0.109.

\* \* \* \* \*